(12) United States Patent
Zhong et al.

(10) Patent No.: US 12,540,261 B2
(45) Date of Patent: Feb. 3, 2026

(54) ANTI-FLUTTER ADHESIVE COMPOSITION

(71) Applicant: Henkel AG & Co. KGaA, Duesseldorf (DE)

(72) Inventors: JinFeng Zhong, Shanghai (CN); Qi Chen, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 481 days.

(21) Appl. No.: 18/300,173

(22) Filed: Apr. 13, 2023

(65) Prior Publication Data
US 2023/0250321 A1 Aug. 10, 2023

Related U.S. Application Data

(63) Continuation of application No. PCT/CN2020/126693, filed on Nov. 5, 2020.

(51) Int. Cl.
| | |
|---|---|
| C09J 127/06 | (2006.01) |
| C08K 5/14 | (2006.01) |
| C09J 11/04 | (2006.01) |
| C09J 11/06 | (2006.01) |
| C09J 163/00 | (2006.01) |
| C08K 3/36 | (2006.01) |

(52) U.S. Cl.
CPC ............ C09J 127/06 (2013.01); C08K 5/14 (2013.01); C09J 11/04 (2013.01); C09J 11/06 (2013.01); C09J 163/00 (2013.01); C08K 3/36 (2013.01); C08K 2201/006 (2013.01); C08K 2201/011 (2013.01)

(58) Field of Classification Search
None
See application file for complete search history.

(56) References Cited

U.S. PATENT DOCUMENTS 6,521,706 B1   2/2003   Desai et al.

FOREIGN PATENT DOCUMENTS

| CA | 2154797 C | * | 6/1995 |
|---|---|---|---|
| CN | 3973234 B2 | * | 9/2007 |
| CN | 102964649 A | | 3/2013 |
| CN | 103172958 A | | 6/2013 |
| CN | 101875220 A | | 7/2014 |
| CN | 104327783 A | | 2/2015 |
| CN | 109988286 A | | 7/2019 |
| CN | 110305610 A | * | 10/2019 |
| CN | 110437767 A | | 11/2019 |
| CN | 110520497 A | | 11/2019 |
| DE | 102009026824 A1 | * | 12/2010 |
| JP | H04142382 A | | 5/1992 |
| JP | H08127689 A | | 5/1996 |
| JP | 2000501436 A | | 2/2000 |
| JP | 2000096026 A | | 4/2000 |
| JP | 2002363531 A | | 12/2002 |
| JP | 2014156525 A | | 8/2014 |
| KR | 1020080020780 A | | 3/2008 |
| WO | 2017078087 A1 | | 5/2017 |

OTHER PUBLICATIONS

International Search Report for PCT/CN2020/126693, mailing date Jul. 26, 2021.
Supplementary EP Search Report for EP 20960301.8 mailed Apr. 29, 2024.

* cited by examiner

Primary Examiner — Tae H Yoon
(74) Attorney, Agent, or Firm — Mary K. Cameron

(57) ABSTRACT

This invention relates to an anti-flutter adhesive composition, comprising a) at least one ethylenically unsaturated polymer; b) at least one PVC homopolymer having a K value from 67 to 75; c) at least one PVC copolymer having a K value from 60 to 75; d) at least one epoxy resin; e) at least one epoxy curing agent; f) at least one first organic peroxide having a decomposition temperature from 125 to 180° C.; and g) at least one second organic peroxide having a decomposition temperature less than 125° C. The anti-flutter adhesive composition can be cured across a wide temperature and have excellent shear strength and good appearance after cured.

17 Claims, No Drawings

ANTI-FLUTTER ADHESIVE COMPOSITION

TECHNICAL FIELD

This invention relates to an anti-flutter adhesive composition, comprising a) at least one ethylenically unsaturated rubber; b) at least one PVC homopolymer having a K value from 67 to 75; c) at least one PVC copolymer having a K value from 60 to 75; d) at least one epoxy resin; e) at least one epoxy curing agent; f) at least one first organic peroxide having a decomposition temperature from 125 to 180° C.; and g) at least one second organic peroxide having a decomposition temperature less than 125° C. The anti-flutter adhesive composition can be cured across a wide temperature range and have excellent shear strength and good appearance after cured.

BACKGROUND OF THE INVENTION

Anti-flutter adhesives are mostly used in bonding the inner and outer panels of automotive parts, and to reduce any vibration of the outer and inner panels relative to each other. Typically, an anti-flutter adhesive is heated at a baking window from 170 to 200° C. depending on the production line of the automotive so that the anti-flutter adhesive can be properly cured. However, the current baking window requires high energy inputs and does not meet with the global trend of energy saving.

Therefore, there is a need for developing an anti-flutter adhesive which can be cured at a lower temperature ranging from 150 to 170° C. to save energy, and more desirably can be cured across a wide temperature range covering from 150 to 200° C. so that it can be applied to different automotive production lines.

SUMMARY OF THE INVENTION

The present invention relates to an anti-flutter adhesive composition, comprising:
 a. at least one ethylenically unsaturated rubber;
 b. at least one PVC homopolymer having a K value from 67 to 75;
 c. at least one PVC copolymer having a K value from 60 to 75;
 d. at least one epoxy resin;
 e. at least one epoxy curing agent;
 f. at least one first organic peroxide having a decomposition temperature from 125 to 180° C.; and
 g. at least one second organic peroxide having a decomposition temperature less than 125° C.;
wherein the amount of the first organic peroxide is from 0.4 to 0.8% by weight based on the total weight of the composition; and the amount of the second organic peroxide is from 0.2 to 1% by weight based on the total weight of the composition.

The anti-flutter adhesive composition can be cured under a temperature ranging from 150 to 200° C.

The present invention also relates to a cured product of the anti-flutter adhesive composition. The cured anti-flutter adhesive composition has excellent shear strength to various substrates and exhibits good appearance.

The present invention also relates to an article bonded by or filled with the cured product of the anti-flutter adhesive composition.

DETAILED DESCRIPTION OF THE INVENTION

In the following passages the present invention is described in more detail. Each aspect so described may be combined with any other aspect or aspects unless clearly indicated to the contrary. In particularly, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In the context of this disclosure, a number of terms shall be utilized.

The term "ethylenically unsaturated" refers to at least a site of unsaturation, which is not aromatic.

The term "rubber" refers to a polymer that has the ability to return to its original shape after it is stretched or deformed.

The term "K value" is to describe the degree of polymerization of a polymer. It is determined according to DIN EN ISO 1628-2.

The term "decomposition temperature" refers to the temperature at which 50% of the peroxide dissociates/decomposes substantially into free radicals within 1 hour which can initiate other reactions. It is determined by thermogravimetric analysis (TGA). Preferably, TA instrument Q500 is used for the analysis which is carried out at a heating rate of 5° C./min under nitrogen.

Ethylenically Unsaturated Rubber

The anti-flutter adhesive composition of the present invention comprises at least one ethylenically unsaturated rubber. Suitable ethylenically unsaturated rubbers include natural rubbers, synthetic rubbers, and mixtures thereof. In some embodiments, the ethylenically unsaturated rubber preferably has a number average molecular weight of 30,000 g/mol or more, such as 50,000 g/mol, 100,000 g/mol and 300,000 g/mol measured by GPC.

Representative examples of suitable synthetic rubbers include but are not limited to styrene-butadiene rubber (SBR), styrene-butadiene-vinylpyridine rubber, chloroprene rubber, isoprene rubber (IR), isoprene-isobutylene rubber (IIR), polybutadiene rubber (BR), ethylene-propylene-diene monomer terpolymer (EPDM), acrylonitrile-butadiene rubber (NBR), polysiloxanes comprising ethylenic unsaturation, polyurethanes containing ethylenic unsaturation, and mixtures thereof.

In some embodiments, the ethylenically unsaturated rubber is preferably a styrene-butadiene rubber (SBR), a polybutadiene rubber (BR), or the mixture thereof.

Examples of commercially available ethylenically unsaturated rubber are, for example, SBR 1009 from Lion Elastomer; BR 9000 from Beijing Yanshan Petrochemical Rubber Chemical Co., Ltd.; and BR 9000 from Sinopec Gaoqiao Petrochemical Co., Ltd.

In some embodiments of the present invention, the amount of the ethylenically unsaturated rubber is from 2 to 10%, and preferably from 4 to 8% by weight based on the total weight of the anti-flutter adhesive composition.

PVC Polymer

The anti-flutter adhesive composition of the present invention comprises at least one PVC homopolymer with a K value from 67 to 75, and at least one PVC copolymer with a K value from 60 to 75.

The PVC copolymer may result from the copolymerization of vinyl chloride with one or more ethylenically unsaturated comonomers. Comonomers useful in the formation of a PVC copolymer include, but are not limited to, vinylidene halides such as vinylidene chloride or fluoride, vinyl carboxylates, such as vinyl acetate, vinyl propionate or vinyl butyrate, vinyl aromatic derivatives, such as styrene or vinyl naphthalene, olefins, such as ethylene, propene or 1-butene.

In some embodiments of the present invention, the PVC homopolymer preferably has a K value from 68 to 71.

In some embodiments of the present invention, the PVC copolymer preferably has a K value from 63 to 70.

It is surprisingly found that when incorporating both PVC homopolymer and PVC copolymer with proper K values in the composition, the anti-flutter adhesive composition can be cured over a wide range of temperatures, and the cured product has good appearance and excellent shear strength to various substrates, such as aluminum panel, cold rolled steel and galvanized steel.

Examples of commercially available PVC homopolymer are, for example, VESTOLIT E 7031 and P 1353 K from VESTOLIT GmbH & Co. KG. Examples of commercially available PVC copolymer are, for example, PCMA 12 from Shenyang Chemical Co., Ltd; and Lacovyl PA 1384 from Arkema.

In some embodiments of the present invention, the amount of the PVC homopolymer is preferably from 6 to 15%, more preferably from 7 to 10%, and even more preferably 8 to 9% by weight based on the total weight of the anti-flutter adhesive composition.

In some embodiments of the present invention, the amount of the PVC copolymer is preferably from 2 to 5%, and more preferably from 3 to 4% by weight based on the total weight of the anti-flutter adhesive composition.

Epoxy Resin

The anti-flutter adhesive composition of the present invention comprises at least one epoxy resin. The epoxy resin may be any common epoxy resin containing at least one epoxy group per molecule, and preferably containing multiple epoxy groups per molecule. Exemplary of the epoxy resin includes but is not limited to bisphenol A epoxy resins, bisphenol F epoxy resins, biphenyl epoxy resins, naphthalene epoxy resins, diphenyl ether epoxy resins, diphenyl thioether epoxy resins, hydroquinone epoxy resins, biphenyl novolac epoxy resins, cresol novolac epoxy resins, phenol novolac epoxy resins, bisphenol A novolac epoxy resins, trisphenol epoxy resins, tetraphenylethane epoxy resins, and any combination thereof.

Examples of commercially available epoxy resin are, for example, D.E.R. 331 from Olin Corporation; EPON 828 from Shell Chemical Corporation; YD-128 from Kukdo Chemical Co., Ltd.; and EPICLON N-665 from Dainippon Ink and Chemicals Inc.

In some embodiments of the present invention, the amount of the epoxy resin is preferably from 1 to 6%, and more preferably from 3 to 5% by weight based on the total weight of the anti-flutter adhesive composition.

Epoxy Curing Agent

The anti-flutter adhesive composition of the present invention comprises at least one epoxy curing agent. The epoxy curing agent refers to any commonly used curing agent for epoxy systems, and includes but is not limited to polyamide, amine, imidazole and the derivatives thereof. Illustrative curing agent include dicyandiamide, polyamide resin based on dimerized fatty acid and polyamines, methyldiethanolamine, triethanolamine, diethylaminopropylamine, benzyldimethylamine, m-xylene di(dimethylamine), benzyldimethylamine, 2,4,6-tris(dimethylaminomethyl) phenol, 1-methylimidazole, 2-methylimidazole and 2,4-diethylimidazole.

Examples of commercially available epoxy curing agent, for example, are Versamid 140 from Gabriel Performance Products; Ancamine TEPA from Evonik; Ajicure PN-H from Ajinomoto Fine-Techno Co., Ltd.; Fujicure-FXR-1090FA from T & K Toka; 1,2-dimethyl imidazole from Shikoku Chemicals Corporation; 2E4 MI, from Evonik; Gaskamine 240 from Mitsubishi Gas Chemical; and Ecure 14 from Alz Chem.

In some embodiments of the present invention, the amount of the epoxy curing agent is preferably from 0.01 to 2%, and more preferably from 0.4 to 0.8% by weight based on the total weight of the anti-flutter adhesive composition.

Organic Peroxide

The anti-flutter adhesive composition of the present invention comprises at least one first organic peroxide having a decomposition temperature from 125 to 180° C. and at least one second organic peroxide having a decomposition temperature less than 125° C.

In some embodiments of the present invention, the first organic peroxide preferably has a decomposition temperature from 130 to 160° C., and more preferably from 130 to 140° C.

In some embodiments of the present invention, the first organic peroxide is preferably dicumyl peroxide.

In some embodiments of the present invention, the second organic peroxide preferably has a decomposition temperature from 50 to 120° C., more preferably from 80 to 120° C., and even more preferably from 100 to 115° C.

In some embodiments of the present invention, the second organic peroxide is preferably 1,1-bis(tert-butylperoxy)-3,3,5-trimethylcyclohexane.

Exemplary of the first organic peroxide includes but is not limited to dicumyl peroxide (DCP), di(tert-butyl) peroxide and 2,5-dimethyl-2,5-bis(t-butylperoxy)-hexyne (DBPH).

Exemplary of the second organic peroxide includes but is not limited to bis(2,4-dichlorobenzoyl) peroxide (DCBP), dibenzoyl peroxide, and 1,1-bis(tert-butylperoxy)-3,3,5-trimethylcyclohexane.

Examples of commercially available first organic peroxide, for example, are DCP from Taicang Plastic Additive Co., Ltd.; and DCP-40 from Jiangsu Daoming Chemical Co., Ltd.

Examples of commercially available second organic peroxide, for example, are Varox 231 XL from Vanderbilt Chemicals, LLC; and TMCH-40 from United Initiators Inc.

In some embodiments of the present invention, the amount of the first organic peroxide is from 0.4 to 0.8%, and preferably from 0.5 to 0.7% by weight based on the total weight of the anti-flutter adhesive composition.

In some embodiments of the present invention, the amount of the second organic peroxide is from 0.2 to 1%, and preferably from 0.3 to 0.4% by weight based on the total weight of the anti-flutter adhesive composition.

It is surprisingly found that when incorporating two kinds of organic peroxide with proper decomposition temperatures in the composition, the anti-flutter adhesive composition can be cured over a wide range of temperatures, and the cured product has good appearance and excellent shear strength to various substrates, such as aluminum panel, cold rolled steel and galvanized steel.

Further, it is surprisingly found that PVC homopolymer and PVC copolymer with proper K values, and two kinds of organic peroxide with proper decomposition temperatures could work synergistically to realize the curing of the anti-flutter adhesive composition over a wide range of temperatures.

Optional Additives

The anti-flutter adhesive composition may further comprise optional additives. The selection of suitable additives for the anti-flutter adhesive composition of the invention depends on the specific intended use of the anti-flutter adhesive composition and can be determined in the individual case by those skilled in the art.

<Nano-Sized Inorganic Filler>

The anti-flutter adhesive composition of the present invention may optionally comprise at least one nano-sized inorganic filler. The nano-sized inorganic filler of the present invention preferably has a 70%-by-volume particle diameter (D70) from 20 to 80 nm, more preferably has a D70 from 40 to 60 nm, and even more preferably has a D70 from 50 to 55 nm. D70 value refers to the cumulative volume distribution curve at which 70% by volume of the particles have a diameter less than said value. The particle diameter of the nano-sized inorganic filler is determined according to laser diffractometry preferably using a Partica LA-950 Laser Scattering Particle Size Distribution Analyzer available from Horiba.

Example of commercially available nano-sized inorganic filler is, for example, TA 17 from Wuhu Perfection Nanometer New Material Co., Ltd.

In some embodiments of the present invention, the amount of the nano-sized inorganic filler is preferably from 0 to 30%, more preferably from 10 to 30%, and even more preferably from 15 to 20% by weight based on the total weight of the anti-flutter adhesive composition.

<Fumed Silica>

The anti-flutter adhesive composition of the present invention may optionally comprise at least one fumed silica with a B.E.T surface area from 150 to 250 $m^2/g$, preferably from 170 to 230 $m^2/g$. The value of B.E.T surface area is determined according to GB/T 10722.

Example of commercially available fumed silica is, for example, CAB-O-SIL M-5 from Cabot Corporation.

In some embodiments of the present invention, the amount of the fumed silica having a B.E.T surface area is from 150 to 250 $m^2/g$ is preferably from 0 to 3%, more preferably from 1.5 to 3%, and even more preferably 2 to 3% by weight based on the total weight of the anti-flutter adhesive composition.

It is surprisingly found that when incorporating both nano-sized inorganic particle and fumed silica having a proper B.E.T surface area in the composition, the anti-sagging property of the anti-flutter adhesive composition is greatly improved. This is important for the anti-flutter adhesive composition because the anti-flutter adhesive composition is typically applied to automotive panels with large gaps. If the adhesive composition sags, the cured product of the adhesive composition would have deteriorated appearance and anti-flutter property.

<Plasticizer>

The anti-flutter adhesive composition of the present invention may optionally comprise at least one plasticizer. The plasticizer of the present invention refers to any common plasticizer known in the art. Exemplary of the plasticizer includes but is not limited to epoxy-based plasticizers (such as epoxidized soybean oil, epoxidized linseed oil, and epoxidized cottonseed oil), phosphate esters, aliphatic esters, aromatic esters, dioctyl terephthalate (DOTP), dioctyl phthalate (DOP), di(isononyl) phthalate (DINP), di(isodecyl) phthalate (DIDP), diundecyl phthalate (DUP), dioctyl Adipate (DOA), diisononyl adipate (DINA), trioctyl trimellitate (TOTM), trioctyl phosphate (TOP), tricresyl phosphate (TCP) and the like. The plasticizers can be used alone or in any combination.

Examples of commercially available plasticizer are, for example, DOTP from Sinopharm; DOA from Wengiang Chemical; and DINP from Taizhou Liancheng Chemical Co., Ltd.

In some embodiments of the present invention, the amount of the plasticizer is from 0 to 40%, and preferably from 15 to 30% by weight based on the total weight of the anti-flutter adhesive composition.

<Heat Stabilizer>

The anti-flutter adhesive composition of the present invention may optionally comprise at least one heat stabilizer. The heat stabilizer of the present invention refers to any common heat stabilizer known in the art which functions to protect PVC polymer during the heating process. Exemplary of the heat stabilizer includes but is not limited to methyltin mercaptide, butyltin mercaptide, and octyltin mercaptide.

In some embodiments of the present invention, the amount of the heat stabilizer is from 0 to 0.2%, and preferably from 0.01 to 0.1% by weight based on the total weight of the anti-flutter adhesive composition.

<Blowing Agent>

The anti-flutter adhesive composition of the present invention may optionally comprise at least one blowing agent known in the art. The blowing agent causes the formation of gas which then creates cells to form porous structure in the cured product of the anti-flutter adhesive composition. The blowing agent of the present invention can be a physical blowing agent, a chemical blowing agent, or a combination of the two. Exemplary of the blowing agent includes but is not limited to carbon dioxide gas, nitrogen gas, air, halogenated hydrocarbon, a bicarbonate, an azo compound, a hydrazine derivative.

In some embodiments of the present invention, the amount of the blowing agent is from 0 to 1%, and preferably from 0.2 to 0.6% by weight based on the total weight of the anti-flutter adhesive composition.

<Cross-Linking Agent>

The anti-flutter adhesive composition of the present invention may optionally comprise at least one cross-linking agent known in the art. The cross-linking agent preferably has at least two ethylenically unsaturated groups. Exemplary of the cross-linking agent includes but is not limited to diacrylate, such as zinc dimethacrylate and magnesium dimethacrylate; acrylic acid and methacrylic acid esters of alcohols such as trimethylolpropane trimethacrylate; and vinyl acrylate.

In some embodiments of the present invention, the amount of the cross-linking agent is from 0 to 10%, and preferably from 0.1 to 5% by weight based on the total weight of the anti-flutter adhesive composition.

<Thermo-Expandable Microsphere>

The anti-flutter adhesive composition of the present invention may optionally comprise at least one thermo-expandable microsphere known in the art to assist foaming of the composition. The heat-expandable microspheres may be microspheres formed by surrounding a substance which readily becomes gaseous and expands upon heating, such as, e.g., isobutane, propane, or pentane, methylbutane in elastic shells. The elastic shells could be made of a substance which melts or bursts due to thermal expansion. Exemplary of such substances constituting the shells includes but is not limited to vinylidene chloride/acrylonitrile copolymers, acrylonitrile/methacrylonitrile copolymers, poly(methyl methacrylate), polyacrylonitrile, poly(vinylidene chloride), and the like.

Examples of commercially available thermo-expandable microsphere are, for example, Matsumoto Microsphere from Matsumoto Yushi-Seiyaku Co., Ltd.; and Advancell EM H 204 from Sekisui Chemical Co., Ltd.

In some embodiments of the present invention, the amount of thermo-expandable microsphere is from 0 to 1%, and preferably from 0.2 to 0.4% by weight based on the total weight of the anti-flutter adhesive composition.

<Additional Inorganic Filler>

The anti-flutter adhesive composition of the present invention may optionally comprise at least one additional inorganic filler which is different from the nano-sized inorganic filler and preferably has a 70%-by-volume particle diameter (D70) greater than 500 nm. Exemplary of the additional inorganic filler includes but is not limited to calcium carbonate and metal oxide, such as titanium dioxide, magnesium oxide, zinc oxide, iron oxide, chromium oxide, zirconium oxide, and aluminum oxide.

In some embodiments of the present invention, the amount of additional inorganic filler is from 0 to 10%, and preferably from 2 to 6% by weight based on the total weight of the anti-flutter adhesive composition.

Other optional additives that may be used in anti-flutter adhesive composition of the present invention, include but are not limited to antioxidants; biocides; dyes; pigments; and the mixtures thereof.

In a Preferred Embodiment, the Anti-Flutter Adhesive Composition Comprises:

a. from 2 to 10% by weight of at least one ethylenically unsaturated rubber;
b. from 6 to 15% by weight of at least one PVC homopolymer having a K value from 67 to 75;
c. from 2 to 5% by weight of at least one PVC copolymer having a K value from 60 to 75;
d. from 1 to 6% by weight of at least one epoxy resin;
e. from 0.01 to 2% by weight of at least one epoxy curing agent;
f. from 0.4 to 0.8% by weight of at least one first organic peroxide having a decomposition temperature from 125 to 180° C.;
g. from 0.2 to 1% by weight of at least one second organic peroxide having a decomposition temperature less than 125° C.;
h. from 0 to 30% by weight of at least one nano-sized inorganic filler;
i. from 0 to 3% by weight of at least one fumed silica having a B.E.T surface area from 150 to 250 m$^2$/g;
j. from 0 to 40% by weight of at least one plasticizer;
k. from 0 to 0.2% by weight of at least one heat stabilizer;
l. from 0 to 1% by weight of at least one blowing agent;
m. from 0 to 10% by weight of at least one cross-linking agent;
n. from 0 to 10% by weight of at least one additional inorganic filler; and
o. from 0 to 1% by weight of at least one thermo-expandable microsphere;

wherein the weight percentages of all components add up to 100% by weight.

The anti-flutter adhesive composition of the present invention may be prepared by mixing at least one ethylenically unsaturated rubber, at least one PVC homopolymer having a K value from 67 to 75, at least one PVC copolymer having a K value from 60 to 75, at least one epoxy resin, at least one epoxy curing agent, at least one first organic peroxide having a decomposition temperature from 125 to 180° C., at least one second organic peroxide having a decomposition temperature less than 125° C., together with the optional additives, such as at least one nano-sized inorganic filler, at least one fumed silica having a B.E.T surface area from 150 to 250 m$^2$/g, at least one plasticizer, at least one heat stabilizer, at least one blowing agent, at least one cross-linking agent, at least one additional inorganic filler, and at least one thermo-expandable microsphere homogeneously.

The anti-flutter adhesive composition of the present invention may be applied to a substrate surface via a scarper, a sprayer or an extruder, and allowed to be cured at a temperature ranging from 150 to 200° C.

The shear strength of the anti-flutter adhesive composition to various substrates, including cold rolled steels, galvanized steels, and aluminum panels, after cured under different temperatures in the present invention may be measured according to SAE J1523 by mating two substrates together with the adhesive composition.

The shear strength of the anti-flutter adhesive composition of the present invention is preferably greater than or equal to 0.2 Mpa after cured at a temperature ranging from 150 to 200° C., and the cured adhesive is completely separated from the surface of one substrate after the two substrates are pulled apart.

The appearance of the cured anti-flutter adhesive composition of the present invention may be assessed by checking the stickiness of the surface of the cured anti-flutter adhesive composition and whether it is elastic and has cracks on the surface by finger-press method.

The cured anti-flutter adhesive composition of the present invention is preferably elastic, non-sticky, and has no crack on the surface.

The anti-sagging property of the adhesive composition after cured under different temperatures in the present invention may be assessed according to GB/T 31113-2014.

The cured anti-flutter adhesive composition preferably has a dislocation less than or equal to 5 mm.

EXAMPLES

The present invention will be further described and illustrated in detail with reference to the following examples. The examples are intended to assist one skilled in the art to better understand and practice the present invention, however, are not intended to restrict the scope of the present invention. All numbers in the examples are based on weight unless otherwise stated.

Example 1-22

The following materials were used in the examples.
BR 9000 (Butadiene rubber from Beijing Yanshan Petrochemical Rubber Chemical Co., Ltd.);
SBR 1009 (Styrene butadiene rubber from Lion Elastomer);

PCMA 12 (Vinyl chloride/vinyl acetate copolymer with K value of 63.3-67.6 from Shenyang Chemical Co., Ltd.);
Vestolit E 7031 (Homopolymer of polyvinyl chloride with K value of 68-71 from Vestolit GmbH & Co. KG);
PB 1702 (Homopolymer of polyvinyl chloride with K value of 79 from Anhui Tianchen Chemical Co., Ltd.);
FORMOLON PR-450 (Homopolymer of polyvinyl chloride with K value of 65 from *Formosa* Plastics Corporation);
Lacovyl PA 1384 (Vinyl chloride/vinyl acetate copolymer with K value of 69 from Arkema);
YD-128 (Epoxy resin derived from bisphenol A from Kukdo Chemical Co., Ltd.);
Ecure 14 (Dicyandiamide from Alz Chem);
Varox 231 XL (1,1 bis-(t-butylperoxy)-3,3,5-trimethylcyclohexane with a decomposition temperature of 115° C. from Vanderbilt Chemicals LLC);
DCP (Dicumyl peroxide with a decomposition temperature of 135° C. from Taicang Plastic Additive Co., Ltd.);
TMCH-40 (Di(tert.butylperoxy)-3,3,5-trimethylcyclohexane with a decomposition temperature of 114° C. from United Initiators Inc.);
Luvomaxx K CDO 65 W (1,4-Benzoquinone dioxime with a decomposition temperature of 223° C. from Lehmann & Voss & Co.);
TA 17 (Nano-sized calcium carbonate with a particle size (D70) of 50 nm from Wuhu Perfection Nanometer New Material Co., Ltd.);
CAB-O-SIL M-5 (Fumed silica having a B.E.T surface area from 175 to 225 $m^2/g$ from Cabot Corporation);
ESO (Epoxidized soybean oil from Tongxiang Chemical Co., Ltd.);
DINP (Di(isononyl) phthalate from Taizhou Liancheng Chemical Co., Ltd.);
56060K (Octyltin mercaptide from Galate Chemicals);
AC 7000 (Azodicarbonamide from Hanjin Chemical (Shanghai) Co., Ltd.);
Dymalink 708 (Zinc dimethacrylate from Cray Valley);
SR 350 (trimethylolpropane trimethacrylate from Sartomer);
CaO (Calcium oxide from Shanghai Fanhua Inorganic Chemical Co., Ltd.);
ZnO (Zinc oxide from Uszinc (Changshu) Metal Co., Ltd.);
N—$CaCO_3$ (Calcium carbonate from Shanghai Bazi Powder Factory); and
Advancell EM H 204 (Methylbutane encapsulated in acrylonitrile methacrylonitrile copolymer from Sekisui Chemical Co., Ltd.)

The anti-flutter adhesive compositions were prepared as Examples (Ex.) using the components according to Table 1a and Table 1b. The components were mixed at a speed of 30 rpm for 100 minutes under vacuum using Kneader (LK 11 1 from Hermann Linden Maschinenfabrik). The temperature was controlled to be about 35° C. and the vacuum degree was controlled to be about 0.7 Mpa during the preparation process.

The anti-flutter adhesive compositions were then subjected to various tests and the results were reported in Table 2 to 6.

TABLE 1a

Anti-flutter adhesive composition

| Component | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| BR 9000 | 3 | 3 | 3 | 3 | 3 | 3 | 3 | 3 | 3 | 3 | 3 |
| SBR 1009 | 3 | 3 | 3 | 3 | 3 | 3 | 3 | 3 | 3 | 3 | 3 |
| PCMA 12 | 2 | 5 | 4 | 0 | 5 | 4 | 0 | 5 | 4 | 4 | 4 |
| Vestolit E 7031 | 8 | 6 | 7 | 8 | 0 | 0 | 8 | 0 | 6 | 6 | |
| PB 1702 | 0 | 0 | 0 | 0 | 0 | 7 | 0 | 0 | 0 | 0 | 0 |
| FORMOLON PR-450 | 0 | 0 | 0 | 0 | 6 | 0 | 0 | 0 | 0 | 0 | 0 |
| Lacovyl PA 1384 | 0 | 0 | 0 | 4 | 0 | 0 | 0 | 0 | 0 | 0 | 0 |
| YD-128 | 5 | 5 | 5 | 5 | 5 | 5 | 5 | 5 | 5 | 5 | 5 |
| Ecure 14 | 0.3 | 0.3 | 0.3 | 0.3 | 0.3 | 0.3 | 0.3 | 0.3 | 0.3 | 0.3 | 0.3 |
| Varox 231 XL | 1 | 1 | 1 | 1 | 1 | 1 | 1 | 1 | 0.2 | 0.4 | 1 |
| DCP | 0.8 | 0.8 | 0.8 | 0.8 | 0.8 | 0.8 | 0.8 | 0.8 | 0.4 | 0.8 | 0.8 |
| TMCH-40 | 0 | 0 | 0 | 0 | 0 | 0 | 0 | 0 | 0 | 0 | 0 |
| Luvomaxx K CDO 65 W | 0 | 0 | 0 | 0 | 0 | 0 | 0 | 0 | 0 | 0 | 0 |
| TA 17 | 17 | 17 | 17 | 17 | 17 | 17 | 17 | 21 | 17 | 17 | 17 |
| CAB-O-SIL M-5 | 2 | 2 | 2 | 2 | 2 | 2 | 2 | 2 | 2 | 2 | 2 |
| ESO | 5 | 5 | 5 | 5 | 5 | 5 | 5 | 5 | 5 | 5 | 5 |
| DINP | 25 | 24 | 24 | 23 | 24 | 24 | 27 | 26 | 26.2 | 25.6 | 25 |
| 56060K | 0.1 | 0.1 | 0.1 | 0.1 | 0.1 | 0.1 | 0.1 | 0.1 | 0.1 | 0.1 | 0.1 |
| AC 7000 | 0.6 | 0.6 | 0.6 | 0.6 | 0.6 | 0.6 | 0.6 | 0.6 | 0.6 | 0.6 | 0.6 |
| Dymalink 708 | 0.2 | 0.2 | 0.2 | 0.2 | 0.2 | 0.2 | 0.2 | 0.2 | 0.2 | 0.2 | 0.2 |
| SR 350 | 0.6 | 0.6 | 0.6 | 0.6 | 0.6 | 0.6 | 0.6 | 0.6 | 0.6 | 0.6 | 0.6 |
| CaO | 4 | 4 | 4 | 4 | 4 | 4 | 4 | 4 | 4 | 4 | 4 |
| ZnO | 2 | 2 | 2 | 2 | 2 | 2 | 2 | 2 | 2 | 2 | 2 |
| N-$CaCO_3$ | 20 | 20 | 20 | 20 | 20 | 20 | 20 | 20 | 20 | 20 | 20 |
| Advancell EM H 204 | 0.4 | 0.4 | 0.4 | 0.4 | 0.4 | 0.4 | 0.4 | 0.4 | 0.4 | 0.4 | 0.4 |

TABLE 1b

Anti-flutter adhesive composition

| Component | Weight (in grams) | | | | | | | | | | |
|---|---|---|---|---|---|---|---|---|---|---|---|
| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
| BR 9000 | 3 | 3 | 3 | 3 | 3 | 3 | 3 | 3 | 3 | 3 | 3 |
| SBR 1009 | 3 | 3 | 3 | 3 | 3 | 3 | 3 | 3 | 3 | 3 | 3 |
| PCMA 12 | 4 | 4 | 4 | 4 | 4 | 4 | 4 | 4 | 4 | 4 | 4 |
| Vestolit E 7031 | 6 | 6 | 6 | 6 | 6 | 6 | 6 | 6 | 6 | 6 | 6 |
| PB 1702 | 0 | 0 | 0 | 0 | 0 | 0 | 0 | 0 | 0 | 0 | 0 |
| FORMOLON PR-450 | 0 | 0 | 0 | 0 | 0 | 0 | 0 | 0 | 0 | 0 | 0 |
| Lacovyl PA 1384 | 0 | 0 | 0 | 0 | 0 | 0 | 0 | 0 | 0 | 0 | 0 |
| YD-128 | 5 | 5 | 5 | 5 | 5 | 5 | 5 | 5 | 5 | 5 | 5 |
| Ecure 14 | 0.3 | 0.3 | 0.3 | 0.3 | 0.3 | 0.3 | 0.3 | 0.3 | 0.3 | 0.3 | 0.3 |
| Varox 231 XL | 0 | 1 | 1 | 0.4 | 0 | 1 | 1 | 1 | 1 | 1 | 1 |
| DCP | 0.6 | 0.3 | 0.9 | 0 | 0.8 | 0 | 0.8 | 0.8 | 0.8 | 0.8 | 0.8 |
| TMCH-40 | 0.8 | 0 | 0 | 0 | 0 | 0 | 0 | 0 | 0 | 0 | 0 |
| Luvomaxx K CDO 65 W | 0 | 0 | 0 | 0.8 | 0 | 0 | 0 | 0 | 0 | 0 | 0 |
| TA 17 | 17 | 17 | 17 | 17 | 17 | 17 | 10 | 18 | 20 | 10 | 8 |
| CAB-O-SIL M-5 | 2 | 2 | 2 | 2 | 2 | 2 | 2 | 2 | 1.5 | 1 | 1.5 |
| ESO | 5 | 5 | 5 | 5 | 5 | 5 | 5 | 5 | 5 | 5 | 5 |
| DINP | 25.4 | 25.5 | 24.9 | 25.6 | 26.0 | 25.8 | 25 | 25 | 25 | 25 | 25 |
| 56060K | 0.1 | 0.1 | 0.1 | 0.1 | 0.1 | 0.1 | 0.1 | 0.1 | 0.1 | 0.1 | 0.1 |
| AC 7000 | 0.6 | 0.6 | 0.6 | 0.6 | 0.6 | 0.6 | 0.6 | 0.6 | 0.6 | 0.6 | 0.6 |
| Dymalink 708 | 0.2 | 0.2 | 0.2 | 0.2 | 0.2 | 0.2 | 0.2 | 0.2 | 0.2 | 0.2 | 0.2 |
| SR 350 | 0.6 | 0.6 | 0.6 | 0.6 | 0.6 | 0.6 | 0.6 | 0.6 | 0.6 | 0.6 | 0.6 |
| CaO | 4 | 4 | 4 | 4 | 4 | 4 | 4 | 4 | 4 | 4 | 4 |
| ZnO | 2 | 2 | 2 | 2 | 2 | 2 | 2 | 2 | 2 | 2 | 2 |
| N-CaCO$_3$ | 20 | 20 | 20 | 20 | 20 | 20 | 27 | 19 | 17.5 | 28 | 29.5 |
| Advancell EM H 204 | 0.4 | 0.4 | 0.4 | 0.4 | 0.4 | 0.4 | 0.4 | 0.4 | 0.4 | 0.4 | 0.4 |

Test Methods

<Shear Strength>

The shear strength of the anti-flutter adhesive composition was determined according to SAE J1523. Substrates were provided and prepared by wiping them with acetone and allowing them to air-dry for five minutes. The anti-flutter adhesive compositions were extruded onto a surface of a substrate, and two substrates were mated together forming an overlapped glue area of 25×25 mm and a glue thickness of 3 mm. The anti-flutter adhesive compositions were allowed to be cured under a desired temperature from 150 to 200° C. using an incubator BINDER M115 for 40 minutes. The value of shear strength was measured using Zwick Z010 with a pull rate of 50 mm/min.

If the shear strength value was greater than or equal to 0.2 Mpa and the cured adhesive was completely separated from the surface of one substrate (100% CF), the result was acceptable.

When the shear strength value was greater than or equal to 0.2 Mpa, but the cured adhesive broke and left on the surfaces of both substrates after the two substrates were pulled apart, for example 80% of the cured adhesive was left on one substrate and 20% of the cured adhesive was left on the other substrate (80% CF), the result was not acceptable.

<Appearance>

A cold rolled steel with a size of 100*50*0.8 mm (length*width*thickness) was provided. The anti-flutter adhesive composition was extruded onto a surface of the cold rolled steel to form an adhesive stripe with a size of 80*10*6 mm (length*width*thickness). The cold rolled steel was placed in an incubator BINDER M115 and the adhesive stripe was cured under a desired temperature from 150 to 200° C. for 40 mins. The cured adhesive stripe was allowed to be cooled at room temperature for 24 hours.

The appearance of the cured adhesive stripe was checked using finger-press method by pressing the surface of the cured adhesive stripe with a finger. If the cured adhesive stripe was elastic and the surface was non-sticky and had no cracks, the result was reported as "OK". If the cured adhesive had any of the defects described above, the result was reported as "Fail".

<Anti-Sagging Property>

The anti-sagging property of the anti-flutter adhesive composition was determined according to GB/T 31113-2014. A cold rolled steel with a size of 100*50*0.8 mm (length*width*thickness) was provided. The anti-flutter adhesive composition was extruded onto a surface of the cold rolled steel forming a cylinder standing on the cold rolled steel with a diameter of 22 mm and height of 15 mm. The cold rolled steel was then tilted at an angle of 70 degree and the anti-flutter adhesive composition in the cylinder shape was left on the cold roll steel at 25° C. for 30 minutes. The dislocation of the anti-flutter adhesive composition was recorded.

The tilted cold rolled steel together with the anti-flutter adhesive compositions on the surface of the steel was further cured at 155° C. using an incubator BINDER M115 for 30 minutes. The dislocation of the anti-flutter adhesive composition was also recorded.

If the dislocations of the anti-flutter adhesive composition in the cylinder shape were less than or equal to 5 mm at both 25° C. and 155° C., the anti-sagging property of the anti-flutter adhesive composition was acceptable.

TABLE 2a

Shear Strength on cold rolled steel

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 150° C. | 0.57 Mpa 100% CF | 0.56 Mpa 100% CF | 0.53 Mpa 100% CF | 0.55 Mpa 100% CF | 0.18 Mpa 80% CF | 0.56 Mpa 100% CF | 0.47 Mpa 100% CF | 0.27 Mpa 100% CF | 0.27 Mpa 100% CF | 0.33 Mpa 100% CF | 0.35 Mpa 100% CF |
| 155° C. | 0.57 Mpa 100% CF | 0.56 Mpa 100% CF | 0.53 Mpa 100% CF | 0.55 Mpa 100% CF | 0.19 Mpa 80% CF | 0.58 Mpa 100% CF | 0.48 Mpa 100% CF | 0.30 Mpa 100% CF | 0.32 Mpa 100% CF | 0.36 Mpa 100% CF | 0.38 Mpa 100% CF |
| 160° C. | 0.58 Mpa 100% CF | 0.57 Mpa 100% CF | 0.54 Mpa 100% CF | 0.56 Mpa 100% CF | 0.43 Mpa 100% CF | 0.61 Mpa 100% CF | 0.48 Mpa 100% CF | 0.32 Mpa 100% CF | 0.34 Mpa 100% CF | 0.40 Mpa 100% CF | 0.45 Mpa 100% CF |
| 170° C. | 0.60 Mpa 100% CF | 0.57 Mpa 100% CF | 0.56 Mpa 100% CF | 0.58 Mpa 100% CF | 0.45 Mpa 100% CF | 0.66 Mpa 100% CF | 0.5 Mpa 100% CF | 0.35 Mpa 100% CF | 0.38 Mpa 100% CF | 0.48 Mpa 100% CF | 0.56 Mpa 100% CF |
| 200° C. | 0.60 Mpa 100% CF | 0.59 Mpa 100% CF | 0.56 Mpa 100% CF | 0.58 Mpa 100% CF | 0.21 Mpa 100% CF | 0.18 Mpa 100% CF | 0.5 Mpa 100% CF | 0.10 Mpa 100% CF | 0.45 Mpa 100% CF | 0.52 Mpa 100% CF | 0.61 Mpa 100% CF |

TABLE 2b

Shear Strength on cold rolled steel

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| 150° C. | 0.48 Mpa 100% CF | 0.32 Mpa 100% CF | 0.49 Mpa 100% CF | 0.22 Mpa 100% CF | 0.37 Mpa 80% CF | 0.40 Mpa 60% CF | 0.56 Mpa 100% CF | 0.56 Mpa 100% CF | 0.56 Mpa 100% CF | 0.56 Mpa 100% CF | 0.56 Mpa 100% CF |
| 155° C. | 0.55 Mpa 100% CF | 0.35 Mpa 100% CF | 0.50 Mpa 100% CF | 0.24 Mpa 100% CF | 0.44 Mpa 80% CF | 0.39 Mpa 60% CF | 0.56 Mpa 100% CF | 0.56 Mpa 100% CF | 0.56 Mpa 100% CF | 0.56 Mpa 100% CF | 0.56 Mpa 100% CF |
| 160° C. | 0.56 100% CF | 0.40 100% CF | 0.55 100% CF | 0.38 100% CF | 0.42 100% CF | 0.44 90% CF | 0.57 100% CF | 0.57 100% CF | 0.57 100% CF | 0.57 100% CF | 0.57 100% CF |
| 170° C. | 0.60 Mpa 100% CF | 0.45 Mpa 100% CF | 0.60 Mpa 100% CF | 0.49 Mpa 100% CF | 0.42 Mpa 100% CF | 0.40 Mpa 100% CF | 0.57 Mpa 100% CF | 0.57 Mpa 100% CF | 0.57 Mpa 100% CF | 0.57 Mpa 100% CF | 0.57 Mpa 100% CF |
| 200° C. | 0.62 Mpa 100% CF | 0.48 Mpa 100% CF | 0.13 Mpa 100% CF | 0.20 Mpa 100% CF | 0.12 Mpa 100% CF | 0.42 Mpa 100% CF | 0.59 Mpa 100% CF | 0.59 Mpa 100% CF | 0.59 Mpa 100% CF | 0.59 Mpa 100% CF | 0.59 Mpa 100% CF |

TABLE 3a

Shear Strength on galvanized steel

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 150° C. | 0.56 Mpa 100% CF | 0.56 Mpa 100% CF | 0.56 Mpa 100% CF | 0.51 Mpa 100% CF | 0.16 Mpa 80% CF | 0.54 Mpa 100% CF | 0.48 Mpa 100% CF | 0.19 Mpa 100% CF | 0.29 Mpa 100% CF | 0.35 Mpa 100% CF | 0.35 Mpa 100% CF |
| 155° C. | 0.56 Mpa 100% CF | 0.56 Mpa 100% CF | 0.56 Mpa 100% CF | 0.51 Mpa 100% CF | 0.17 Mpa 80% CF | 0.57 Mpa 100% CF | 0.48 Mpa 100% CF | 0.25 Mpa 100% CF | 0.30 Mpa 100% CF | 0.37 Mpa 100% CF | 0.40 Mpa 100% CF |

TABLE 3a-continued

Shear Strength on galvanized steel

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 160° C. | 0.57 Mpa 100% CF | 0.57 Mpa 100% CF | 0.57 Mpa 100% CF | 0.53 Mpa 100% CF | 0.44 Mpa 100% CF | 0.63 Mpa 100% CF | 0.48 Mpa 100% CF | 0.28 Mpa 100% CF | 0.38 Mpa 100% CF | 0.45 Mpa 100% CF | 0.50 Mpa 100% CF |
| 170° C. | 0.57 Mpa 100% CF | 0.57 Mpa 100% CF | 0.57 Mpa 100% CF | 0.53 Mpa 100% CF | 0.48 Mpa 100% CF | 0.67 Mpa 100% CF | 0.53 Mpa 100% CF | 0.30 Mpa 100% CF | 0.40 Mpa 100% CF | 0.55 Mpa 100% CF | 0.60 Mpa 100% CF |
| 200° C. | 0.59 Mpa 100% CF | 0.59 Mpa 100% CF | 0.59 Mpa 100% CF | 0.55 Mpa 100% CF | 0.22 Mpa 100% CF | 0.16 Mpa 100% CF | 0.54 Mpa 100% CF | 0.15 Mpa 100% CF | 0.47 Mpa 100% CF | 0.58 Mpa 100% CF | 0.67 Mpa 100% CF |

TABLE 3b

Shear Strength on galvanized

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| 150° C. | 0.45 Mpa 100% CF | 0.30 Mpa 100% CF | 0.45 Mpa 100% CF | 0.23 Mpa 100% CF | 0.35 Mpa 80% CF | 0.37 Mpa 60% CF | 0.56 Mpa 100% CF | 0.56 Mpa 100% CF | 0.56 Mpa 100% CF | 0.56 Mpa 100% CF | 0.56 Mpa 100% CF |
| 155° C. | 0.50 Mpa 100% CF | 0.38 Mpa 100% CF | 0.55 Mpa 100% CF | 0.25 Mpa 100% CF | 0.38 Mpa 80% CF | 0.39 Mpa 60% CF | 0.56 Mpa 100% CF | 0.56 Mpa 100% CF | 0.56 Mpa 100% CF | 0.56 Mpa 100% CF | 0.56 Mpa 100% CF |
| 160° C. | 0.57 Mpa 100% CF | 0.42 Mpa 100% CF | 0.60 Mpa 100% CF | 0.34 Mpa 100% CF | 0.41 Mpa 100% CF | 0.40 Mpa 90% CF | 0.57 Mpa 100% CF | 0.57 Mpa 100% CF | 0.57 Mpa 100% CF | 0.57 Mpa 100% CF | 0.57 Mpa 100% CF |
| 170° C. | 0.62 Mpa 100% CF | 0.47 Mpa 100% CF | 0.67 Mpa 100% CF | 0.44 Mpa 100% CF | 0.40 Mpa 100% CF | 0.43 Mpa 100% CF | 0.57 Mpa 100% CF | 0.57 Mpa 100% CF | 0.57 Mpa 100% CF | 0.57 Mpa 100% CF | 0.57 Mpa 100% CF |
| 200° C. | 0.67 Mpa 100% CF | 0.46 Mpa 100% CF | 0.12 Mpa 100% CF | 0.23 Mpa 100% CF | 0.13 Mpa 100% CF | 0.43 Mpa 100% CF | 0.59 Mpa 100% CF | 0.59 Mpa 100% CF | 0.59 Mpa 100% CF | 0.59 Mpa 100% CF | 0.59 Mpa 100% CF |

TABLE 4a

Shear Strength on aluminum panel

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 150° C. | 0.53 Mpa 100% CF | 0.53 Mpa 100% CF | 0.53 Mpa 100% CF | 0.48 Mpa 100% CF | 0.17 Mpa 60% CF | 0.53 Mpa 100% CF | 0.44 Mpa 100% CF | 0.20 Mpa 100% CF | 0.20 Mpa 100% CF | 0.32 Mpa 100% CF | 0.31 Mpa 100% CF |
| 155° C. | 0.53 Mpa 100% CF | 0.53 Mpa 100% CF | 0.53 Mpa 100% CF | 0.48 Mpa 100% CF | 0.18 Mpa 80% CF | 0.59 Mpa 100% CF | 0.44 Mpa 100% CF | 0.20 Mpa 100% CF | 0.30 Mpa 100% CF | 0.34 Mpa 100% CF | 0.35 Mpa 100% CF |
| 160° C. | 0.54 Mpa 100% CF | 0.54 Mpa 100% CF | 0.54 Mpa 100% CF | 0.52 Mpa 100% CF | 0.48 Mpa 100% CF | 0.66 Mpa 100% CF | 0.46 Mpa 100% CF | 0.24 Mpa 100% CF | 0.32 Mpa 100% CF | 0.38 Mpa 100% CF | 0.47 Mpa 100% CF |
| 170° C. | 0.56 Mpa 100% CF | 0.56 Mpa 100% CF | 0.56 Mpa 100% CF | 0.52 Mpa 100% CF | 0.42 Mpa 100% CF | 0.67 Mpa 100% CF | 0.49 Mpa 100% CF | 0.25 Mpa 100% CF | 0.35 Mpa 100% CF | 0.45 Mpa 100% CF | 0.58 Mpa 100% CF |

TABLE 4a-continued

Shear Strength on aluminum panel

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 200° C. | 0.56 Mpa 100% CF | 0.56 Mpa 100% CF | 0.56 Mpa 100% CF | 0.55 Mpa 100% CF | 0.22 Mpa 100% CF | 0.15 Mpa 100% CF | 0.49 Mpa 100% CF | 0.19 Mpa 100% CF | 0.40 Mpa 100% CF | 0.48 Mpa 100% CF | 0.59 Mpa 100% CF |

TABLE 4b

Shear Strength on aluminum panel (Mpa)

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| 150° C. | 0.45 Mpa 100% CF | 0.30 Mpa 100% CF | 0.48 Mpa 100% CF | 0.20 Mpa 100% CF | 0.36 Mpa 80% CF | 0.38 Mpa 60% CF | 0.50 Mpa 100% CF | 0.49 Mpa 100% CF | 0.48 Mpa 100% CF | 0.45 Mpa 100% CF | 0.53 Mpa 100% CF |
| 155° C. | 0.50 Mpa 100% CF | 0.32 Mpa 100% CF | 0.52 Mpa 100% CF | 0.29 Mpa 100% CF | 0.39 Mpa 80% CF | 0.38 Mpa 60% CF | 0.52 Mpa 100% CF | 0.57 Mpa 100% CF | 0.51 Mpa 100% CF | 0.59 Mpa 100% CF | 0.58 Mpa 100% CF |
| 160° C. | 0.52 Mpa 100% CF | 0.41 Mpa 100% CF | 0.57 Mpa 100% CF | 0.39 Mpa 100% CF | 0.40 Mpa 100% CF | 0.40 Mpa 90% CF | 0.56 Mpa 100% CF | 0.54 Mpa 100% CF | 0.55 Mpa 100% CF | 0.57 Mpa 100% CF | 0.58 Mpa 100% CF |
| 170° C. | 0.61 Mpa 100% CF | 0.42 Mpa 100% CF | 0.66 Mpa 100% CF | 0.49 Mpa 100% CF | 0.37 Mpa 100% CF | 0.45 Mpa 100% CF | 0.60 Mpa 100% CF | 0.63 Mpa 100% CF | 0.62 Mpa 100% CF | 0.67 Mpa 100% CF | 0.59 Mpa 100% CF |
| 200° C. | 0.65 Mpa 100% CF | 0.45 Mpa 100% CF | 0.15 Mpa 100% CF | 0.15 Mpa 100% CF | 0.14 Mpa 100% CF | 0.45 Mpa 100% CF | 0.56 Mpa 100% CF | 0.51 Mpa 100% CF | 0.53 Mpa 100% CF | 0.55 Mpa 100% CF | 0.58 Mpa 100% CF |

TABLE 5a

Appearance of cured anti-flutter adhesive composition

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 150° C. | OK | OK | OK | OK | OK | OK | Fail | Fail | OK | OK | OK |
| 155° C. | OK | OK | OK | OK | OK | OK | Fail | Fail | OK | OK | OK |
| 160° C. | OK | OK | OK | OK | OK | OK | OK | OK | OK | OK | OK |
| 170° C. | OK | OK | OK | OK | OK | OK | OK | OK | OK | OK | OK |
| 200° C. | OK | OK | OK | OK | OK | OK | OK | OK | OK | OK | OK |

TABLE 5b

Appearance of cured anti-flutter adhesive composition

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| 150° C. | OK | Fail | OK | Fail | OK | Fail | OK | OK | OK | OK | OK |
| 155° C. | OK | OK | OK | OK | OK | Fail | OK | OK | OK | OK | OK |
| 160° C. | OK | OK | OK | OK | OK | OK | OK | OK | OK | OK | OK |
| 170° C. | OK | OK | OK | OK | OK | OK | OK | OK | OK | OK | OK |
| 200° C. | OK | OK | Fail | Fail | Fail | OK | OK | OK | OK | OK | OK |

The shear strength of the anti-flutter adhesive composition after cured to various substrates is reported in Table 2-4 and the appearance of cured anti-flutter adhesive composition is reported in Table 5. It is found that it is essential for the anti-flutter adhesive composition to incorporate at least one PVC homopolymer having a K value from 67 to 75, at least one PVC copolymer having a K value from 60 to 75, at least one first organic peroxide having a decomposition temperature from 125 to 180° C., and at least one second organic peroxide having a decomposition temperature less than 125° C. so that the shear strength of the anti-flutter adhesive composition after cured was greater than or equal to 0.2 Mpa. Further, the cured anti-flutter adhesive composition was completely separated from one substrate after the two substrates were pulled apart, and the cured anti-flutter adhesive composition had good appearance. When the K value of the PVC polymer, the decomposition temperature of the organic peroxide, the amount of the PVC polymer, or the amount of the organic peroxide was not in the desired range, either the shear strength of the anti-flutter adhesive composition after cured or the appearance of the cured anti-flutter adhesive composition was deteriorated as shown in Examples from 5 to 8 and Examples from 13 to 17.

TABLE 6a

Anti-sagging property of the anti-flutter adhesive composition

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| 25° C. | 1 mm | 1 mm | 1 mm | 1 mm | 1 mm | 1 mm | 1 mm | 1 mm | 1 mm | 1 mm | 1 mm |
| 155° C. | 1 mm | 1 mm | 1 mm | 1 mm | 1 mm | 1 mm | 1 mm | 1 mm | 1 mm | 1 mm | 1 mm |

TABLE 6b

Anti-sagging property of the anti-flutter adhesive composition

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| 25° C. | 1 mm | 1 mm | 1 mm | 1 mm | 1 mm | 1 mm | 3 mm | 2 mm | 2 mm | 6.5 mm | 6 mm |
| 155° C. | 1 mm | 1 mm | 1 mm | 1 mm | 1 mm | 1 mm | 1 mm | 1 mm | 1 mm | 3 mm | 3 mm |

The anti-sagging property of the anti-flutter adhesive composition is reported in Table 6. It is found that it is essential for the anti-flutter adhesive composition to incorporate at least one nano-sized inorganic filler and at least one fumed silica having a B.E.T surface area from 150 to 250 m²/g so that the anti-flutter adhesive composition had excellent anti-sagging property. If either of the nano-sized inorganic filler or the fumed silica was missing from the composition, or the amount of the nano-sized inorganic filler or the fumed silica was not in the desired range, the cured anti-flutter adhesive composition had large dislocation as demonstrated in Examples 21 and 22.

What is claimed is:

1. An anti-flutter adhesive composition comprising:
   a) at least one ethylenically unsaturated rubber;
   b) at least one PVC homopolymer having a K value from 67 to 75;
   c) at least one PVC copolymer having a K value from 60 to 75;
   d) at least one epoxy resin;
   e) at least one epoxy curing agent;
   f) at least one first organic peroxide having a decomposition temperature from 125 to 180° C.; and
   g) at least one second organic peroxide having a decomposition temperature less than 125° C.;
   wherein the amount of the at least one first organic peroxide is from 0.4 to 0.8% by weight based on total weight of the composition; and the amount of the at least one second organic peroxide is from 0.2 to 1% by weight based on the total weight of the composition.

2. The anti-flutter adhesive composition according to claim 1, wherein the PVC homopolymer has a K value from 68 to 71.

3. The anti-flutter adhesive composition according to claim 1, wherein the amount of the PVC homopolymer is from 6 to 15% by weight based on the total weight of the composition.

4. The anti-flutter adhesive composition according to claim 1, wherein the PVC copolymer has a K value from 63 to 70.

5. The anti-flutter adhesive composition according to claim 1, wherein the amount of the PVC copolymer is from 2 to 5% by weight based on the total weight of the composition.

6. The anti-flutter adhesive composition according to claim 1, wherein the first organic peroxide has a decomposition temperature from 130 to 160° C.

7. The anti-flutter adhesive composition according to claim 1, wherein the first organic peroxide comprises dicumyl peroxide.

8. The anti-flutter adhesive composition according to claim 1, wherein the amount of the first organic peroxide is from 0.5 to 0.7% by weight based on the total weight of the composition.

9. The anti-flutter adhesive composition according to claim 1, wherein the second organic peroxide has a decomposition temperature in a range from 50 to 120° C.

10. The anti-flutter adhesive composition according to claim 1, wherein the second organic peroxide comprises 1,1-bis(tert-butylperoxy)-3,3,5-trimethylcyclohexane.

11. The anti-flutter adhesive composition according to claim 1, wherein the amount of the second organic peroxide is from 0.3 to 0.4% by weight based on the total weight of the composition.

12. The anti-flutter adhesive composition according to claim 1, further comprising at least one nano-sized inorganic filler, and least one fumed silica having a B.E.T surface area in a range from 150 to 250 m²/g.

13. The anti-flutter adhesive composition according to claim 12, wherein the at least one nano-sized inorganic filler is present in an amount of from 10 to 30% based on the total weight of the composition, and the amount of the fumed silica having a B.E.T surface area in the range from 150 to 250 m²/g is present in an amount of from 1.5 to 3% based on the total weight of the composition.

14. The anti-flutter adhesive composition according to claim 12, wherein the at least one nano-sized inorganic filler is present in an amount of from 15 to 20% based on the total weight of the composition, and the amount of the fumed silica having a B.E.T surface area in the range from 150 to 250 m²/g is present in an amount of from 2 to 3% based on the total weight of the composition.

15. The anti-flutter adhesive composition according to claim 1, comprising:
   (a) from 2 to 10% by weight of the at least one ethylenically unsaturated rubber;
   (b) from 6 to 15% by weight of the at least one PVC homopolymer having a K value from 67 to 75;

(c) from 2 to 5% by weight of the at least one PVC copolymer having a K value from 60 to 75;
(d) from 1 to 6% by weight of the at least one epoxy resin;
(e) from 0.01 to 2% by weight of the at least one epoxy curing agent;
(f) from 0.5 to 0.7% by weight of the at least one first organic peroxide having a decomposition temperature from 125 to 180° C.;
(g) from 0.2 to 1% by weight of the at least one second organic peroxide having a decomposition temperature less than 125° C., wherein the decomposition temperature is in a range of 50 to 120° C.;
wherein the anti-flutter adhesive composition optionally further comprises from 0 to 30% by weight of at least one nano-sized inorganic filler;
from 0 to 3% by weight of at least one fumed silica having a B.E.T surface area from 150 to 250 m²/g;
from 0 to 40% by weight of at least one plasticizer;
from 0 to 0.2% by weight of at least one heat stabilizer;
from 0 to 1% by weight of at least one blowing agent;
from 0 to 10% by weight of at least one cross-linking agent;
from 0 to 10% by weight of at least one additional inorganic filler different from the nano-sized inorganic filler; and
from 0 to 1% by weight of at least one thermo-expandable microsphere;
wherein the weight percentages of all components add up to 100% by weight.

16. A cured product of the anti-flutter adhesive composition according to claim 1.

17. An article of manufacture bonded or filled with the cured product of claim 16.

* * * * *